United States Patent [19]

Kuze

[11] Patent Number: 4,815,112

[45] Date of Patent: Mar. 21, 1989

[54] READ-ONLY SEQUENCE CONTROL SYSTEM

[76] Inventor: Yoshikazu Kuze, 31-3, Higashimagome 1-chome, Ohta-ku, Tokyo, Japan

[21] Appl. No.: 56,666

[22] Filed: Jun. 2, 1987

[30] Foreign Application Priority Data

Jun. 2, 1986 [JP] Japan ................. 61-125706
Apr. 23, 1987 [JP] Japan ................. 62-98739

[51] Int. Cl.$^4$ ............................................. G06F 13/10
[52] U.S. Cl. ........................................ 377/16; 377/2; 377/26
[58] Field of Search ............................... 377/2, 16, 26

[56] References Cited

U.S. PATENT DOCUMENTS

| | | | |
|---|---|---|---|
| 3,391,305 | 7/1968 | Bradwin et al. | 377/16 |
| 4,049,952 | 9/1977 | Forsslund | 377/16 |
| 4,142,238 | 2/1979 | Brandt et al. | 377/16 |
| 4,180,724 | 12/1979 | Councilman et al. | 377/16 |
| 4,258,250 | 3/1981 | Schmidt | 377/16 |
| 4,374,423 | 2/1983 | Kundler et al. | 377/16 |
| 4,524,449 | 6/1985 | Colling | 377/16 |

*Primary Examiner*—John S. Heyman
*Attorney, Agent, or Firm*—Birch, Stewart, Kolasch & Birch

[57] ABSTRACT

A read-only sequence control system comprises a control unit having counters for determining the cycle time of the system and timing for the performance of various operations an EPROM and a plurality of relays responsive to data outputs of the EPROM for controlling a machine. The system has a first sensor for detecting the entrance of a work part into the machine and a second sensor for detecting discharge of the entered work part. When the second sensor does not detect the work at an end of working cycle, the control unit operates to stop the machine.

5 Claims, 4 Drawing Sheets

READ-ONLY SEQUENCE CONTROL SYSTEM

BACKGROUND OF THE INVENTION

The present invention relates to a read-only sequence control system for sequentially controlling manufacturing operations in a factory.

Generally, a compact sequence controller is provided with eight outputs and a cycle time of the operation thereof is about 3 seconds. Further, a large number of sensors are attached to various portions of a machine such as a press in a factory in order to detect abnormalities of products or failures of the machine. Accordingly, the circuit of the controller for the sensors is very complicated.

SUMMARY OF THE INVENTION

The object of the present invention is to provide a read-only sequence control system which is compact in size and simple in structure with low cost.

According to the present invention, there is provided a read-only sequence control system for controlling the operation of a machine, having a memory, a control unit including a clock pulse generating circuit for producing clock pulses, a presettable counter for counting the clock pulses and for producing a read clock pulse after every preset count has been reached, a binary counter for counting the read clock pulse and for producing outputs for addressing the memory, so that the memory produces data outputs to turn on relays for operating the machine, and a control circuit for controlling the start and stop operations of the counters.

The control system comprises a first sensor detecting a feed of a work part into the machine and for producing a feed signal, a first flip-flop responsive to the feed signal for operating the clock pulse generating circuit, presettable counter, and binary counter, first gate means responsive to a count end signal of the binary counter for producing a stop signal for stopping the read clock pulse from being outputted by the presettable counter, second gate means opened by the count end signal, a second sensor detecting a discharge of the fed work part and for producing a discharge signal, first circuit means responsive to the absence of the discharge signal for keeping the second gate means open to produce an abnormality signal, second circuit means responsive to the abnormality signal for stopping operations of the presettable counter.

In one aspect of the invention, the second gate means includes a second flip-flop responsive to the count end signal for producing a gate signal and a gate opened by the gate signal. Further, the first circuit means includes third circuit means responsive to the discharge signal for operating the second flip-flop to invert the gate signal to close the gate and the gate is further responsive to the feed signal to produce the abnormality signal.

These and other objects and features of the present invention will become apparent from the following description with reference to the accompanying drawings.

DESCRIPTION OF THE PREFERRED EMBODIMENT

Figure 1:
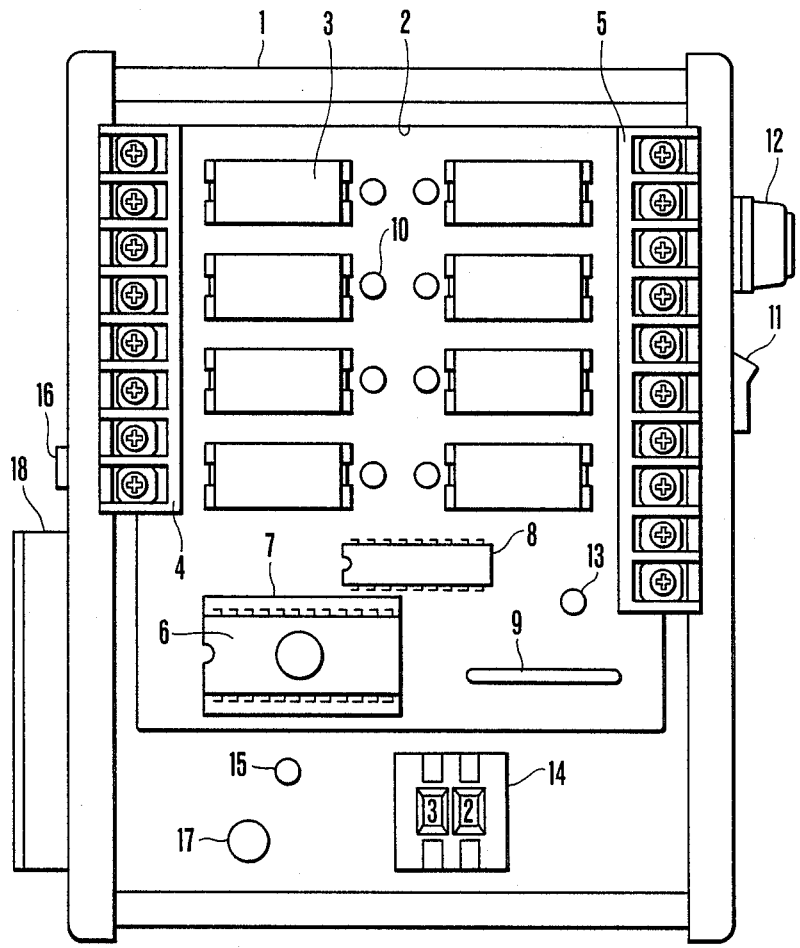
FIG. 1 is a plan view of a read-only sequence control system according to the present invention.
Figure 2:
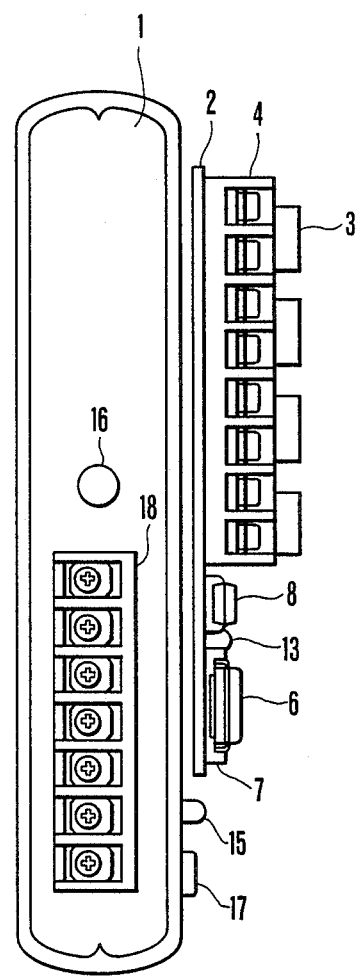
FIG. 2 is a side view of the control system of FIG. 1.

Referring to FIGS. 1 and 2, a read-only sequence control system of the present invention comprises a read clock pulse control unit 1 having a supply source and an output relay unit 2 mounted on the clock pulse control unit 1.

The output relay unit 2 comprises a board detachably secured to the control unit 1. A number of relays 3, such as eight relays are mounted on the board. Terminal units 4 and 5 are disposed adjacent to the relay unit 2. The terminal unit 4 has eight terminals for four relays and the terminal unit 5 has ten terminals for the other four relays and for an alternating current power supply. An EPROM 6 is detachably fixed to a connector 7. Numeral 8 is a transistor array, and 9 is a connector for the clock pulse control unit 1 and the output relay unit 2. A display 10 employed with an LED is provided by displaying the operation of each relay.

On the read clock pulse control unit 1, a power switch 11, fuse 12, pilot lamp 13 with an LED, preset code switch 14, abnormality display 15 with an LED, reset switch 16, starting switch 17, and input terminals 18 are provided. The preset code switch 14 displays digits of two figures for one cycle time and is adapted to select a necessary cycle time. If the unit time for the digits is 0.1 second, digits "32" of preset code switch 14 shown in FIG. 1 signify a cycle time of 3.2 seconds being set. The cycle time of the preset code switch an be set to a time between 0.1 and 9.9 seconds. It is possible to provide a unit time for the cycle time between 1 second and 1 minute by changing a frequency divider in the preset code switch 14. Accordingly, the cycle time can be set between 1 second and 99 minutes.

Figure 3:
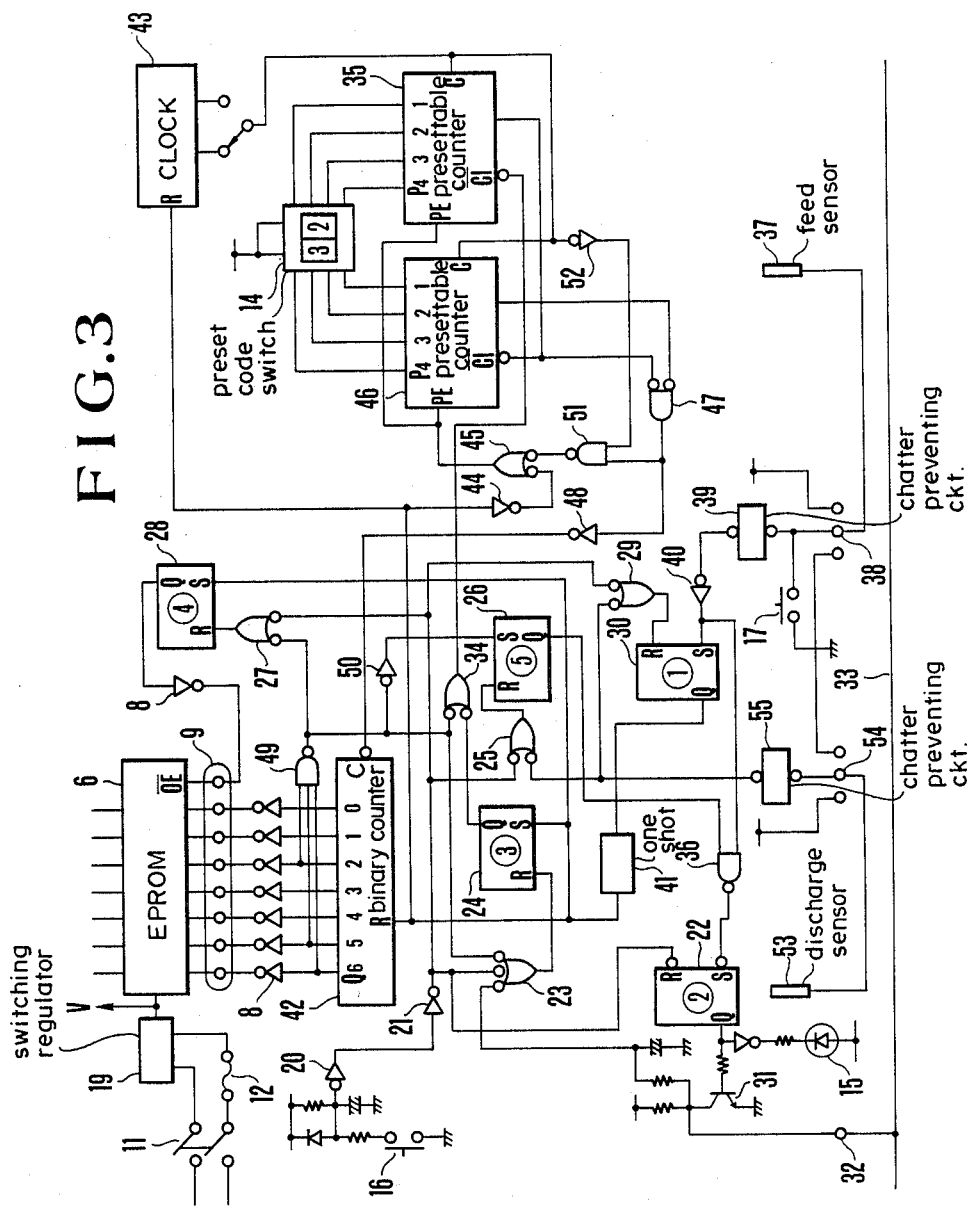
FIG. 3 shows a circuit of a control unit of the present invention.

Referring to FIG. 3 showing a circuit of the control system, the cycle time is set to 3.2 seconds by the preset code switch 14. When power switc 11 and reset switch 16 are depressed, the supply voltage Vcc is obtained by a switching regulator 19, and a system supply voltage is applied to an initial reset circuit 20 to reset each of a number of flip-flops. When the supply voltage is applied, a second flip-flop 22 is reset through an inverter 21, a third flip-flop 24 is reset through a 3-input NAND gate 23, a fifth flip-flop 26 is reset through a 2-input NAND gate 25, a fourth flip-flop 28 is reset through a 2-input NAND gate 27, and a first flip-flop 30 is reset through a 2-input NAND gate 29.

When the second flip-flop 22 is reset, a transistor 31 is turned off causing the output to go to 1. The output at the collector thereof is applied to a NAND gate 23 and to an external control line 33 through an input and output terminal 32.

When the third flip-flop 24 is reset, the output at a 1 level is applied to a $\overline{CI}$ input of a presettable down counter 35 through a 2-input NAND gate 34, so that the presettable down counter stops producing clock pulses.

When the fifth flip-flop 26 is reset, an output at a 0 level is applied to a 2-input NAND gate 36 as an abnormality signal output gate. When the fourth flip-flop 28 is reset, a 1 output inverted through the transistor array 8 is applied to an input $\overline{OE}$ of the EPROM 6, so that the EPROM 6 stops producing data.

When a work product passes a first sensor 37 which is provided near an inlet of a manufacturing machine, a signal having a 0 level is produced to set the first flip-flop 30 through a first input terminal 38, a chatter preventing circuit 39, and inverter 40. A one-shot pulse "1" appears at the output of a one-shot pulse generating circuit 41. This one-shot pulse "1" is applied:

A. to a reset input R of a binary counter 42 and a reset input R of a clock pulse generating circuit 43 to reset them to the zero states, respectively, and to inputs PE of presettable down counters 35 and 46 through an inverter 44 and a 2-input NAND gate 45 to preset the digit "32" of preset code switch 14 in counters 35 and 46, respectively;

B. to a set terminal S of the fourth flip-flop 28, the output Q thereof being applied to the terminal $\overline{OE}$ of the EPROM 6 through one of transistor arrays 8 and the EPROM in turn is set to an output state, and to a set terminal S of the third flip-flop 24 to produce an output 1 which is applied to the terminal $\overline{CI}$ of the presettable down counter 35 through the 2-input NAND gate 34 to produce clock pulses.

The output of the clock pulse generating circuit 43, provided with a crystal oscillator, is 1000 Hz, as clock pulses. The clock pulses are applied to clock lines C of the presettable down counters 35 and 46, respectively. Preset lines P1, P2, P3 and P4 of the presettable down counters are connected to BCD lines of preset code switch 14.

Each time one clock pulse is applied to the presettable counter 35, the preset count therein decreases by one. When 32 clock pulses are applied to the presettable counters, both inputs of a 2-input NOR gate 47 to to a "0". Thus, the 2-input NOR gate 47 produces one read clock pulse.

On the other hand, when the output of the 2-input NOR gate 47 goes to "1", a 2-input NAND gate 51 outputs a "0" when an inverter 52 produces output "1" by a negative going clock input. Thus, therminal PE of each presettable counter are applied, with a pulse "1" through the 2-input NAND gate 45. At this time, the "32" of the preset code switch 14 is preset again in the presettable down counters.

Thus, every time 32 clock pulses are applied to the presettable counters, one read clock pulse is generated from the gate 47. The read clock pulse is applied to the clock line C of the binary counter 42 through an inverter 48. Accordingly, the binary counter 42 produces outputs through address lines Q0 to Q6, so that the outputs are applied to the address in the EPROM 6 through transistor arrays 8 and connector 9.

Time of one cycle is decided by the number of read clock pulses. Operation in the case of 100 read clock pulses in one cycle will be explained hereinafter.

In order to produce the one-cycle end signal upon 100 read clock pulses, address lines Q2, Q5 and Q6 of the binary counter 42 are selected as the inputs of a 3-input NAND gate 49. Since the binary number of "100" is 1100100, when the 100th read clock pulse is applied to the input of the binary counter 42, outputs on the address lines Q2, Q5 and Q6 go to "1" and the 3-input NAND gate 49 produces a one-cycle end signal "0".

On the other hand, the EPROM 6 produces a data signal in response to the address signals, so that respective actuators of the machine are operated through relay unit 2.

When one cycle is completed, the fourth flip-flop 28 is reset through the 2-input NAND gate 27, so that the EPROM 6 stops producing an output. The third flip-flop 24 is reset through 3-input NAND gate 23. The presettable down counters 35, 46 stop producing an output. Thus, each of the actuators of the machine stops. The fifth flip-flop 26 is set through an inverter 50. A first input of the abnormality signal output gate of 2-input NAND gate 36 is changed to "1".

When the work product after the manufacturing process passes a second sensor 53 provided on an outlet of the machine, a signal having a 0 level is applied to a second input terminal 54. The fifth flip-flop 26 is reset through a chattering preventing circuit 55 and 2-input NAND gate 25 to change the first input signal of the abnormality signal output gate of 2-input NAND gate 36 into a "0". Further, the first flip-flop 30 is reset by the output of the 2-input NAND gate 29. Then, the first flip-flop 30 is set when the first sensor 37 produces a signal, thereby restarting the operations of the control system and actuators of the machine. The operations of the actuators are continued unless an abnormality occurs.

When a signal from the second sensor 53 is not applied to the control unit at the end of the one cycle operation, the first input signal of abnormality signal output gate of 2-input NAND gate 36 remains at "1", and first flip-flop 30 is not reset. Accordingly, the first flip-flop 30 is not set even if the signal from the first sensor 37 is applied. A 1 signal from the inverter 40 is applied to a second input of the abnormality signal output gate 36. Since output of the gate 36 goes to "1", the second flip-flop 22 is set. The transistor 31 is turned on to activate the abnormality display 15 to. The output 0 of transistor 31 is applied to the 3-input NAND gate 23 to reset third flip-flop 24, so that a signal at the "1" level is applied to $\overline{CI}$ of counter 35 through the gate 34. Thus, the output of the clock pulse stops and the machine stops.

Figure 4:
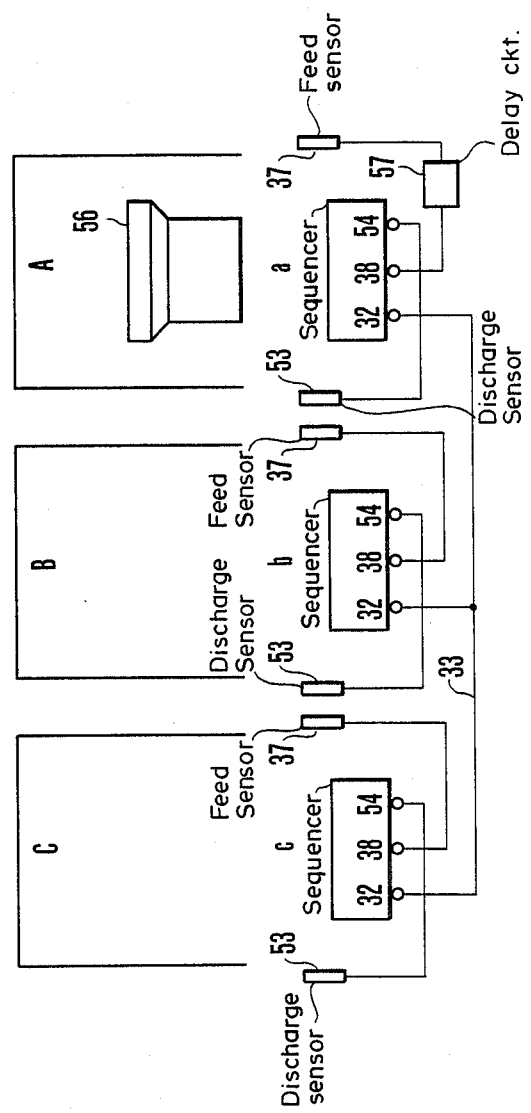
FIG. 4 is a schematic view showing an example of an automatic manufacturing system employed with sequence control systems of the present invention.

Referring to FIG. 4 showing an automatic system consisting of three read-only sequence controllers a, b and c, each of sequence controllers a, b, c is adapted to control manufacturing machines A, B and C, respectively. (Hereinafter the sequence controllers are called sequencers.)

A such first machine A, as a known parts-feeder 56 is provided for automatically lining up work parts at predetermined positions and this operation is repeated. When predetermined numbers of work parts are lined up, the first sensor 37 of the sequencer a detects the parts to produce an output signal. The output signal is applied to the first input terminal 38 through a delay circuit 57. Thus, the sequencer a starts to operate the machine A which operates a feed work parts and stops at the end of one cycle. However, the sequence a is restarted by a signal from the second sensor 53 provided on the outlet of the parts-feeder A. The work parts are fed to the next machine B at regular intervals. When the work parts pass the first sensor 37 of the machine B, the machine B starts by the signal from the sensor 37. Thus, in the same manner, machines A, B, C are sequentially operated. A first product is discharged from the machine C at a third cycle end and thereafter the product is discharged at every cycle end.

If an abnormality occurs in the machine C, the work stops during the process. The second sensor 53 does not produce a signal. A stop signal is produced in accordance with the signal of the first sensor 37 of the sequencer c, so that the sequencers b and a, as well as sequencer c, are stopped through the control line 33. As the abnormality display 15 emits a light signal, inspection and repair of the machine C are done. Thereafter, the reset switch 16 of the sequencer c is depressed and the start switch 17 is depressed, so that the sequencers restart operation at the same time.

The processing of work at the next machine must be finished before the next work product from the previous machine passes the first sensor of the next machine. Accordingly, the cycle time is determined on the basis of a first sequencer. For example, the cycle time of the sequencer a is at 3.2 seconds, sequencer b is set at 2.8 seconds, and sequencer c at 2.4 seconds.

While the invention has been described in conjunction with preferred specific embodiments thereof, it will be understood that this description in intended to illustrate and not limit the scope of the invention, which is defined by the following claims.

What is claimed is:

1. A read-only sequence control system for controlling the operation of a machine, having a memory, a control unit including a clock pulse generating circuit for producing clock pulses, a presettable counter for counting the clock pulses, and for producing a read clock pulse after every preset count has been reached, a binary counter for counting the read clock pulse and for producing outputs for addressing said memory, so that the memory produces data outputs to turn on relays for operating the machine, and a control circuit for controlling start and stop operations of the counters, the control system comprising:

a first sensor detecting a feed of a work part into the machine and for producing a feed signal;

a first flip-flop responsive to said feed signal for operating said clock pulse generating circuit, presettable counter, and binary counter;

first gate means responsive to a count end signal of said binary counter for producing a stop signal for stopping the production of said read clock pulse from the presettable counter;

second gate means opened by the count end signal;

a second sensor detecting a discharge of the fed work part and for producing a discharge signal to close said second gate means;

first circuit means responsive to an absence of said discharge signal for keeping the second gate means open to produce an abnormality signal; and second circuit means responsive to the abnormality signal for stopping operation of the presettable counter.

2. The sequence control system according to claim 1 wherein the second gate means includes a second flip-flop responsive to the count end signal for producing a gate signal and a logic gate opened by said gate signal.

3. The sequence control system according to claim 2 wherein the first circuit means includes means responsive to the discharge signal for operating the second flip-flop to invert the logic gate signal to close the gate.

4. The sequence control system according to claim 3 wherein the logic gate is further responsive to said feed signal to produce the abnormality signal.

5. The sequence control system according to claim 1 further comprising a terminal for connecting to another control system so as to apply an output of the second circuit means of said another control system to stop operation of said presettable counter.

* * * * *